Figure 1:
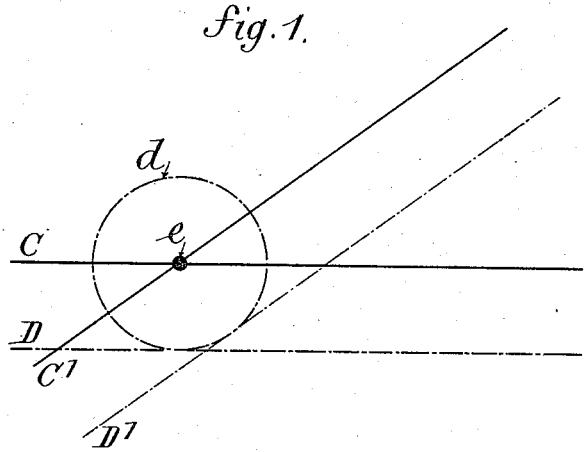

No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.

14 SHEETS—SHEET 1.

Witnesses
Inventor
Ernst Ternström
By H. B. Willson
Attorney

No. 792,180. PATENTED JUNE 13, 1905.
E. TERNSTRÖM.
SUPPORTING DEVICE FOR THE SIGHT ADJUSTING MECHANISMS OF ORDNANCE AND HOWITZERS MOUNTED ON GUN CARRIERS.
APPLICATION FILED NOV. 2, 1904.
14 SHEETS—SHEET 2.
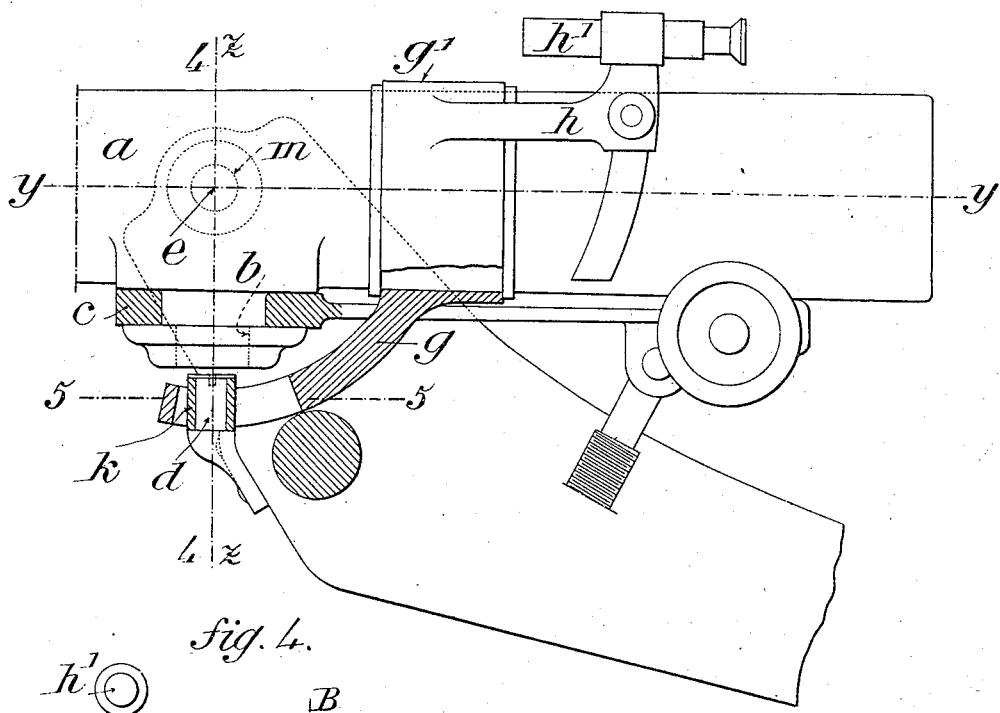
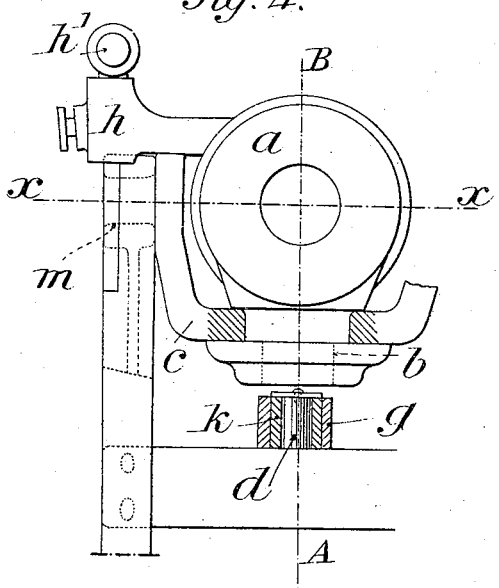
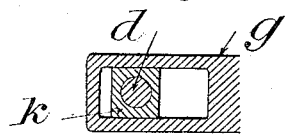
Inventor
Ernst Ternström
Witnesses
J. W. Griesbauer, Jr.
C. H. Griesbauer
By
H. B. Willson
Attorney No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.
14 SHEETS—SHEET 3.
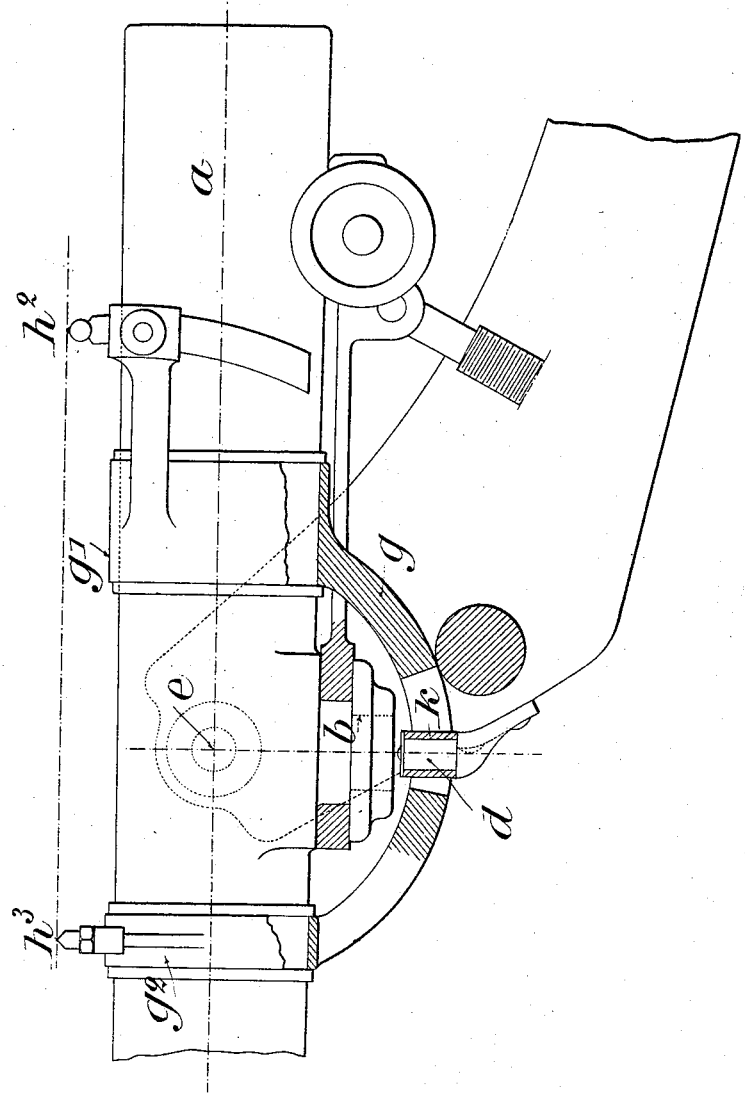
Witnesses
J. A. Griesbauer, Jr.
C. K. Griesbauer.
Inventor
Ernst Ternström
By H. B. Willson
Attorney No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.
14 SHEETS—SHEET 4.
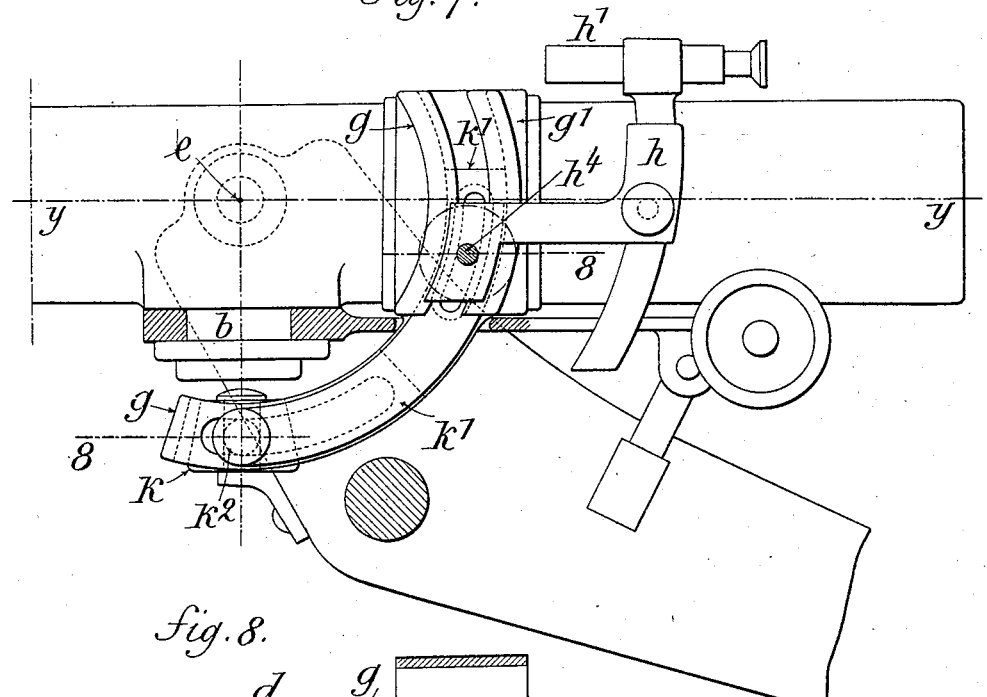
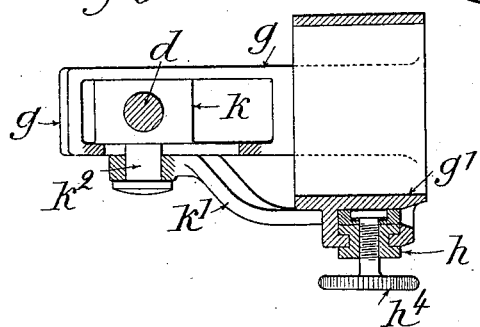
Witnesses
J. W. Griesbauer, Jr.
C. H. Griesbauer.
Inventor
Ernst Ternström
By H. B. Willson
Attorney No. 792,180. PATENTED JUNE 13, 1905.
E. TERNSTRÖM.
SUPPORTING DEVICE FOR THE SIGHT ADJUSTING MECHANISMS OF ORDNANCE AND HOWITZERS MOUNTED ON GUN CARRIERS.
APPLICATION FILED NOV. 2, 1904.
14 SHEETS—SHEET 5.
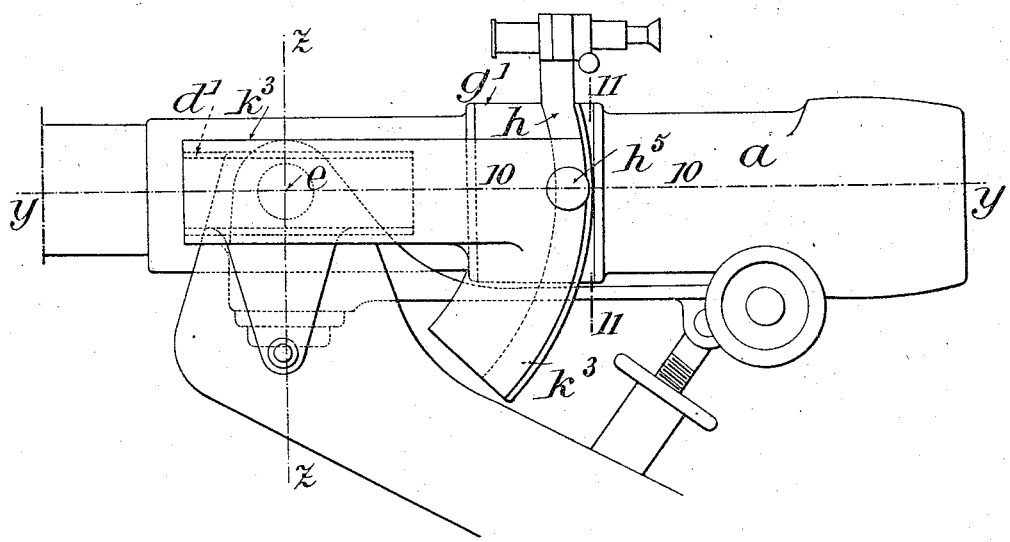
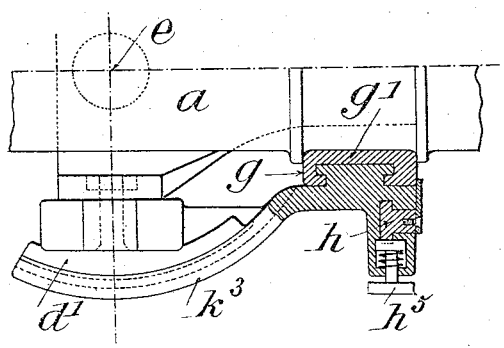
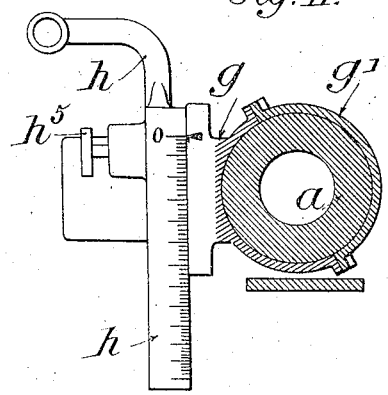
Witnesses
J. A. Griesbauer Jr.
C. H. Griesbauer
Inventor
Ernst Ternström
By H. B. Willson
Attorney No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.
14 SHEETS—SHEET 6.
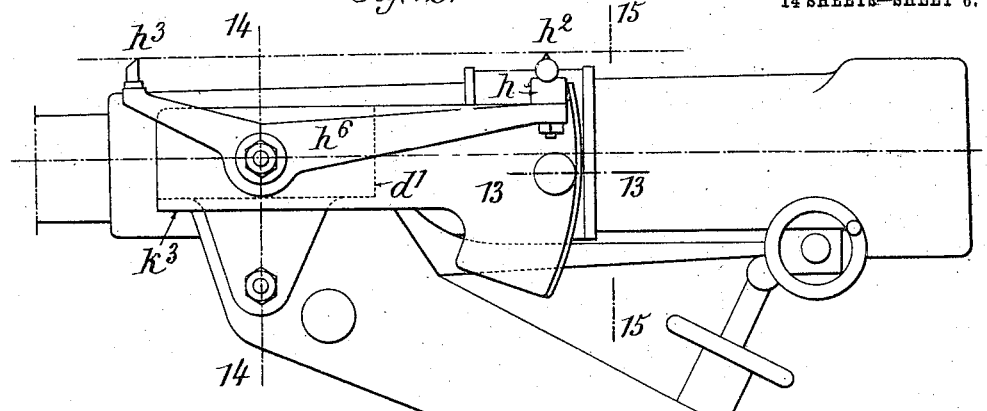
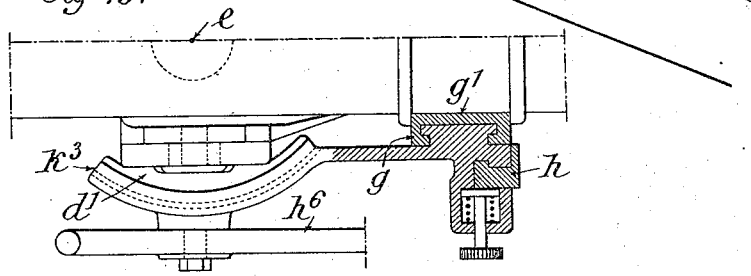
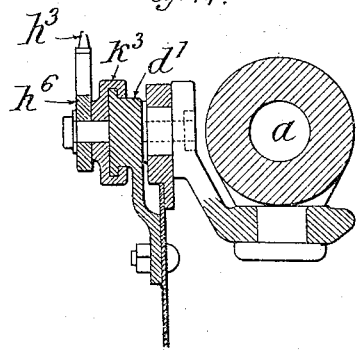 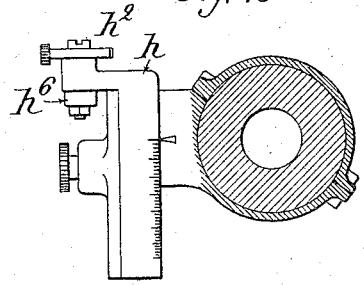
Witnesses
J. W. Griesbauer Jr.
C. H. Griesbauer.
Inventor
Ernst Ternström
By H. B. Willson
Attorney No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.

14 SHEETS—SHEET 7.

Witnesses
J. A. Griesbauer, Jr.
C. H. Griesbauer.

Inventor
Ernst Ternström
By H. B. Willson
Attorney

No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.

14 SHEETS—SHEET 8.

Witnesses
Inventor
Ernst Ternström
By H. B. Willson
Attorney

No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.
14 SHEETS—SHEET 9.
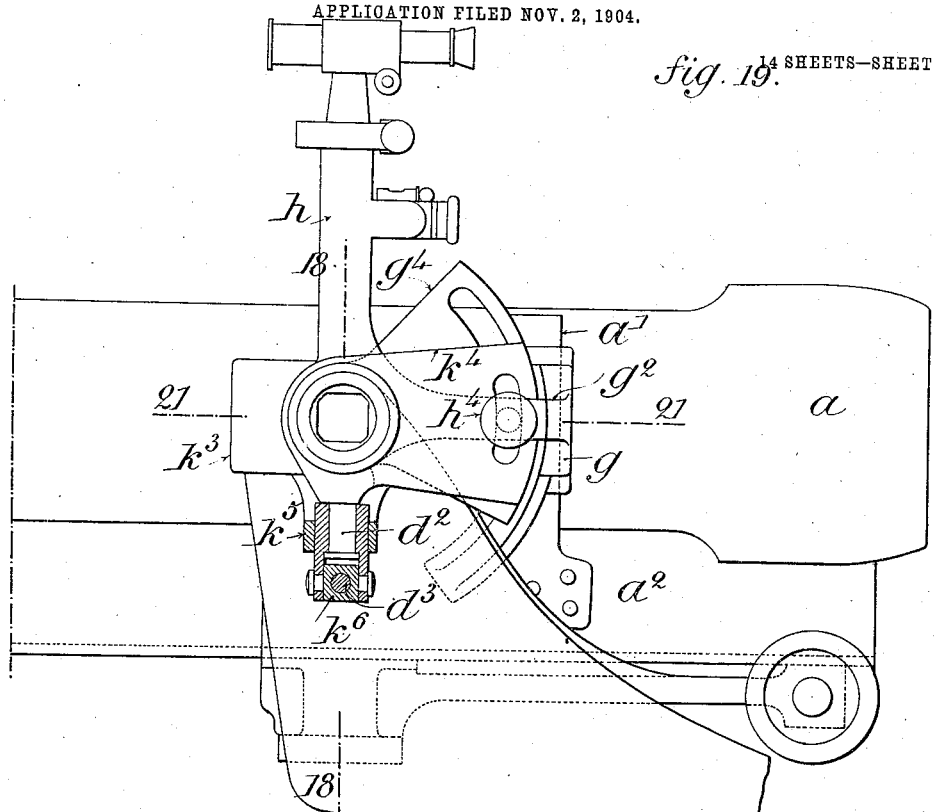
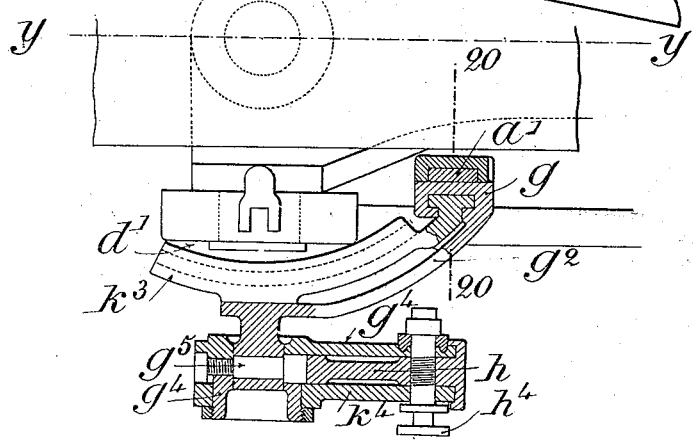
Witnesses
Inventor
Ernst Ternström
By H. B. Willson
Attorney

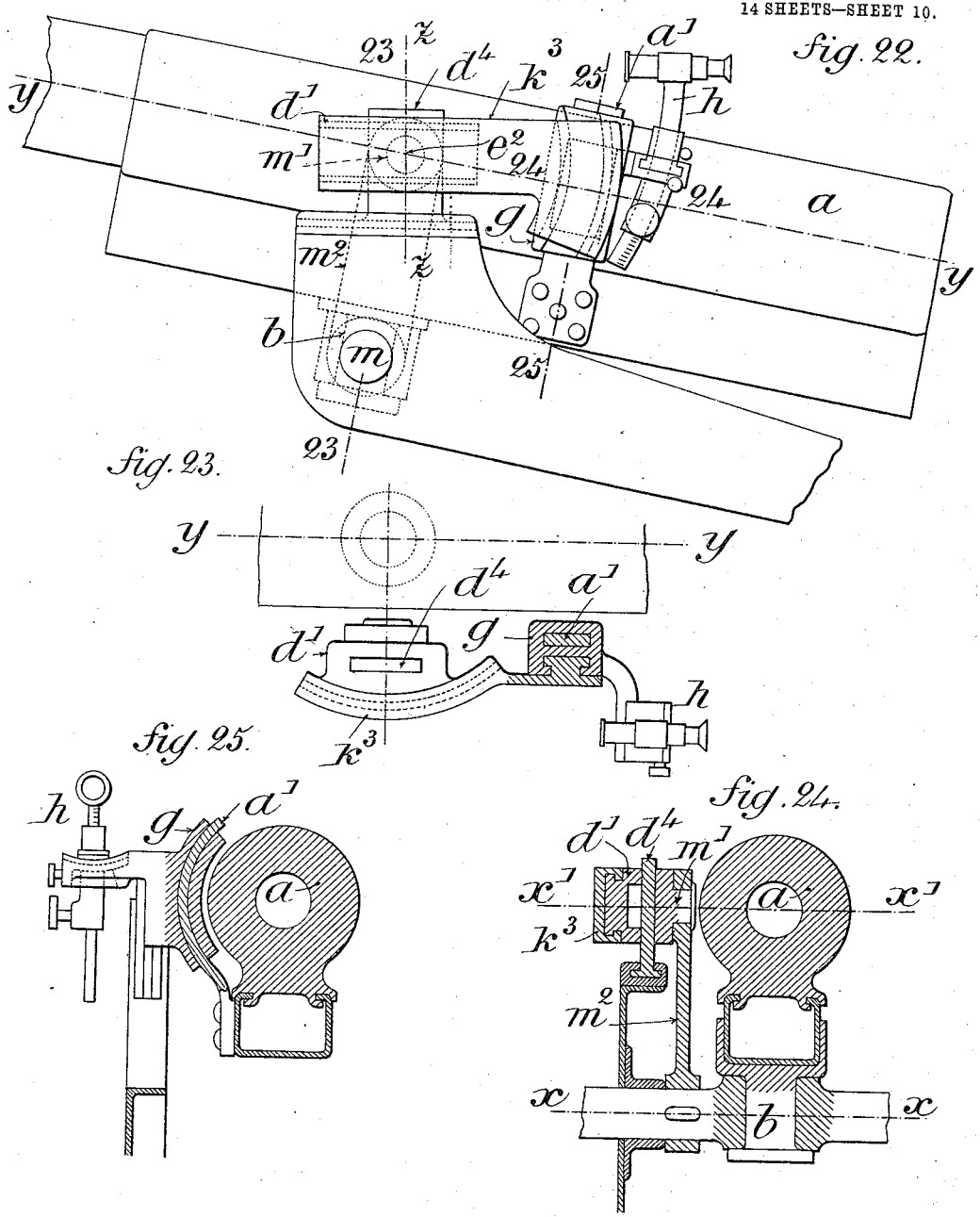

No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.

14 SHEETS—SHEET 11.

Witnesses
J. W. Griesbauer, Jr.
C. H. Griesbauer

Inventor
Ernst Ternström
By H. B. Willson
Attorney

No. 792,180. PATENTED JUNE 13, 1905.
E. TERNSTRÖM.
SUPPORTING DEVICE FOR THE SIGHT ADJUSTING MECHANISMS OF ORDNANCE AND HOWITZERS MOUNTED ON GUN CARRIERS.
APPLICATION FILED NOV. 2, 1904.

14 SHEETS—SHEET 12.

Witnesses
J. A. Griesbauer, Jr.
P. H. Griesbauer.

Inventor
Ernst Ternström
By H. B. Willson
Attorney

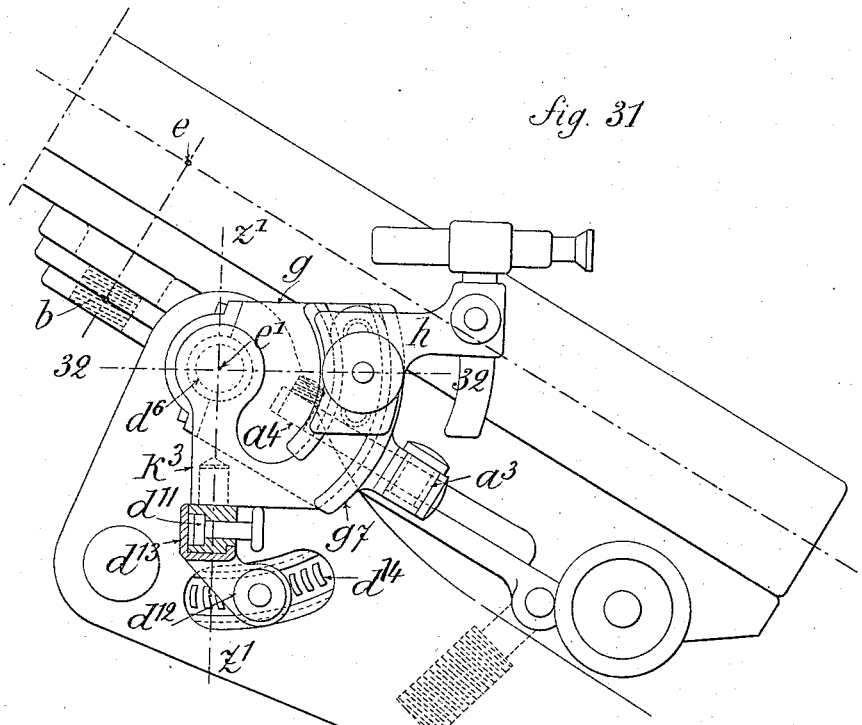
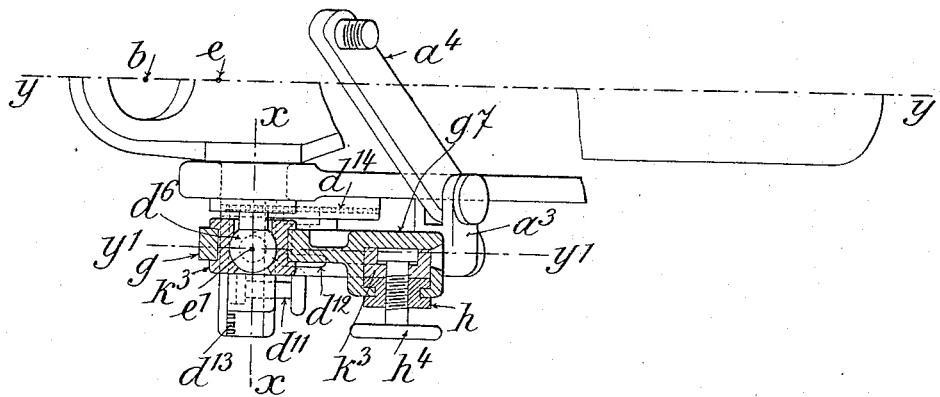

No. 792,180. PATENTED JUNE 13, 1905.
E. TERNSTRÖM.
SUPPORTING DEVICE FOR THE SIGHT ADJUSTING MECHANISMS OF ORDNANCE
AND HOWITZERS MOUNTED ON GUN CARRIERS.
APPLICATION FILED NOV. 2, 1904.
14 SHEETS—SHEET 14.

Witnesses
J. A. Griesbauer Jr.
P. H. Griesbauer

Inventor
Ernst Ternström
By H. B. Willson
Attorney

No. 792,180.

Patented June 13, 1905.

UNITED STATES PATENT OFFICE.

ERNST TERNSTRÖM, OF SERAING-JEMEPPE, BELGIUM.

SUPPORTING DEVICE FOR THE SIGHT-ADJUSTING MECHANISMS OF ORDNANCE AND HOWITZERS MOUNTED ON GUN-CARRIERS.

SPECIFICATION forming part of Letters Patent No. 792,180, dated June 13, 1905.

Application filed November 2, 1904. Serial No. 231,141.

*To all whom it may concern:*

Be it known that I, ERNST TERNSTRÖM, engineer, a Swedish subject, residing at 50 Quai des Carmes, Seraing-Jemeppe sur Meuse, Belgium, have invented certain new and useful Improvements in Supporting Devices for the Sight-Adjusting Mechanism of Ordnance and Howitzers Mounted on Gun-Carriers, of which the following is a specification.

There exists ordnance in which the pointing-pivot becomes inclined when pointing as to height. The said pivot is mounted on a part which is called the "gun-carrier," which itself is capable of swinging, with respect to the gun-carriage, around an axis which is perpendicular to that of the said pivot.

This invention relates to a supporting device for the sight-adjusting mechanism for a gun mounted on the gun-carrier.

The said device comprises, essentially, two parts which, for greater clearness in the specification, will be called the "directing" part and the "guiding" part. The directing part consists of a piece movable around a vertical axis depending on or from the gun-carriage, and the guiding-piece consists of a piece which is movable, with respect to the gun, around on axis always extending in the same direction as the longitudinal axis of the gun, and also, with respect to the guiding part, around an axis which is perpendicular to both the axes previously named. In this general definition the word "vertical" must not be taken as meaning absolutely vertical, but only as showing the position of the axis of rotation of the directing part when the gun-carriage is in its normal position on horizontal ground. The combination of the said parts has for its purpose to cause the guiding part to follow the movements of the gun as to direction and height and the directing part to only follow the movements of the gun as to direction, yet allowing the gun to turn around its longitudinal axis without influencing either the guiding part or the directing part. This result is useful in that it allows of rendering the adjusting mechanism independent of the swinging movements of the gun around its longitudinal axis, which is connected to either the guiding part or the directing part.

Figure 2:
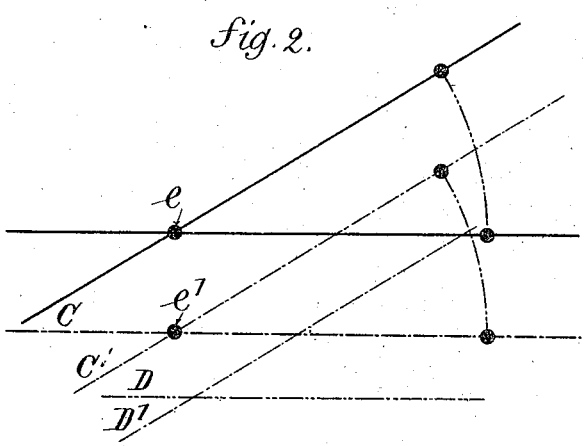

Before describing some forms in which the present invention may be carried out it will be useful to explain clearly, with reference to Figs. 1, 2, and 4 of the accompanying drawings, the end I have in view.

Recent studies have shown the nature and the importance of the errors of direction coming from the inclination of the pivot in pieces of ordnance mounted on a gun-carriage having a gun-carrier, even when the gun-carriage is placed on horizontal ground. Fig. 4 of the accompanying drawings shows, by way of example, a piece of this sort. The gun *a* is capable of moving around a pivot *b* on a support *c*, which is called a "gun-carrier," and which is capable of swinging around an axis X X arranged horizontally on the gun-carriage. The pivot *b* is placed perpendicularly to the axis X X and is capable of taking in the plane of symmetry A of the gun-carriage more or less inclined positions. The plane of symmetry A being vertical and the pivot *b* being inclined, it will be understood that the plane of symmetry of the gun takes divers inclinations when turning around the pivot. Hereinafter I shall designate as the "main plane of the line of aim" the plane described by the line of aim when its inclination is caused to be varied in height and when the aiming device lies in its average adjusted position as to direction corresponding to zero of the scale of deviations. As is well known, to correct the deviation and the influence of the wind the line of aim will be adjusted either to the left or right of the said main plane. In the sort of gun-pivoting on a gun-carrier as shown in Fig. 4 there has already been used a support for the line of aim guided on the gun-carriage and so connected with the gun as to follow its movements as to direction; but in this case the main plane of the line of aim is connected rigidly to the gun-carrier, so that it remains parallel to the plane of symmetry B of the gun, and consequently becomes inclined when the gun turns around the inclined pivot *b*. To make up for the digressions due to the inclination of the pivot *b*, it is necessary that the main plane of the line of aim shall lie not only parallel to the axis of the gun, but always vertical at the same time— that is to say, that the projections of the line of aim (the deviation being considered *nil*) and of the axis of the gun on the horizontal plane shall always be parallel, whatever the pointing angle may be as to height or to direction. Such a result can be obtained by connecting the main plane of the line of aim coöperatively with a determined plane of direction through a vertical line and through a line parallel to the axis of the gun intersecting the said vertical line. Generally there is on the axis of the gun a fixed point in space around which the gun oscillates in direction and in height, this point lying at the common intersection of the axis of the gun of its pivot and of its trunnions. The vertical line of the aforesaid plane of direction may pass through this fixed point, and the plane of direction is then determined by the said vertical line and the axis of the gun. In Fig. 1, C is the plane of direction passing through the fixed point $e$ of the axis of the gun, and D the projection of the main plane of the line of aim, which is parallel to the plane C and coöperatively connected with the same. When the plane C turns with the gun and comes to C', the main plane of the line of aim remains parallel and comes to D', so that it moves in turning around the vertical line passing through the point $e$ and remains tangent to the vertical cylinder $d$. It follows that the plane D can be guided either by a vertical pivot fixed to the gun-carriage at the point $e$ or by a slideway fixed concentric to the vertical line of the point $e$. However, the plane of direction may pass quite as well through any fixed vertical line more or less distant from the point $e$—for instance, through the vertical line $e'$. (See Fig. 2.) Hereinafter the directing part may be considered as being the material realization of the plane of direction, while the adjusting mechanism represents materially the main plane of the line of aim.

A certain number of forms of the supporting device for the adjusting mechanism to which my invention relates will now be described with reference to the accompanying drawings, such forms being given by way of example.

Figure 16:
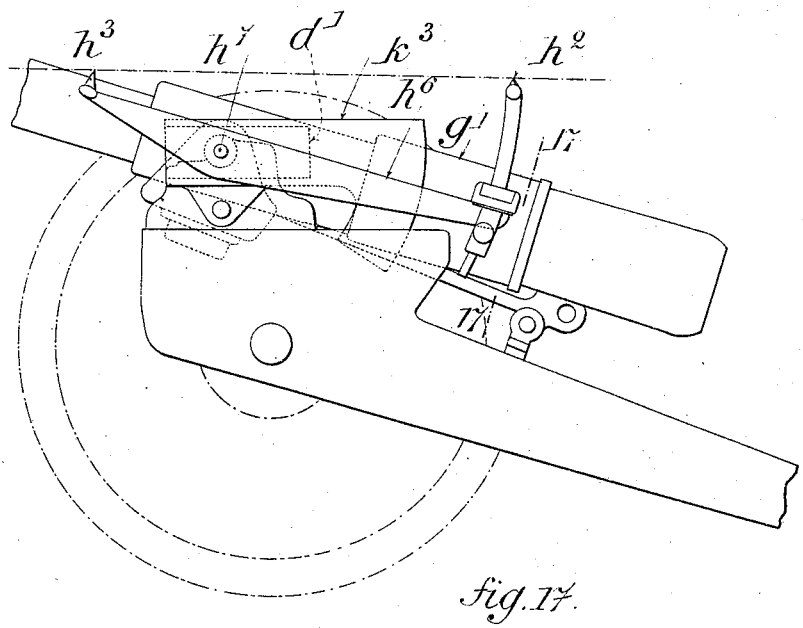
Figure 17:
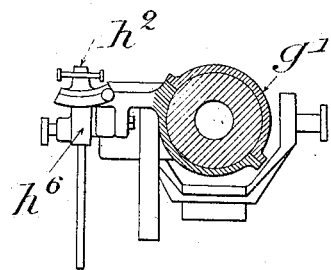
Figure 13:
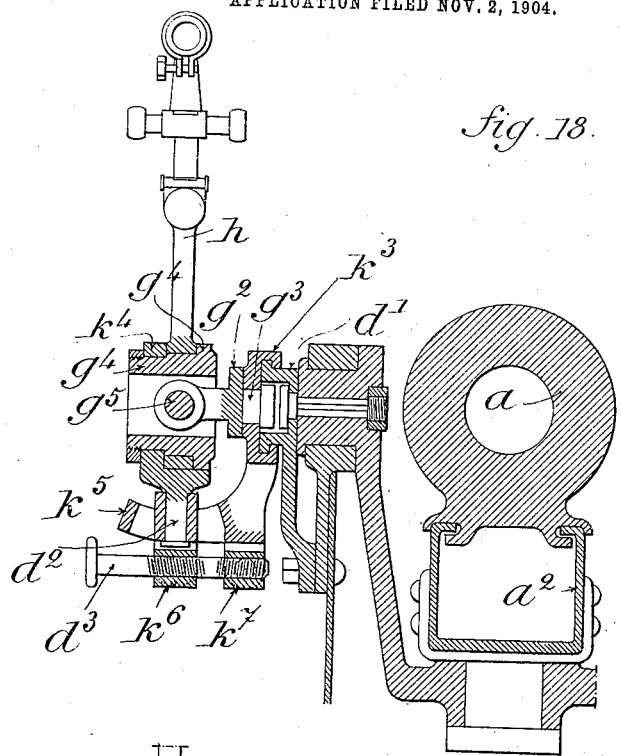
Figure 20:
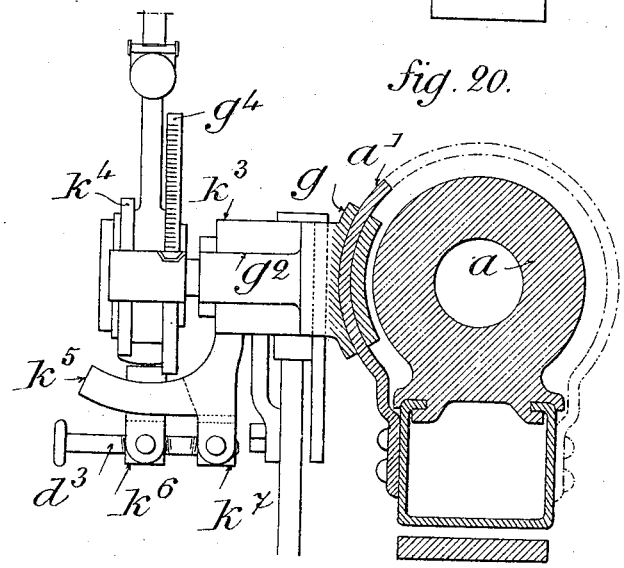
Figure 26:
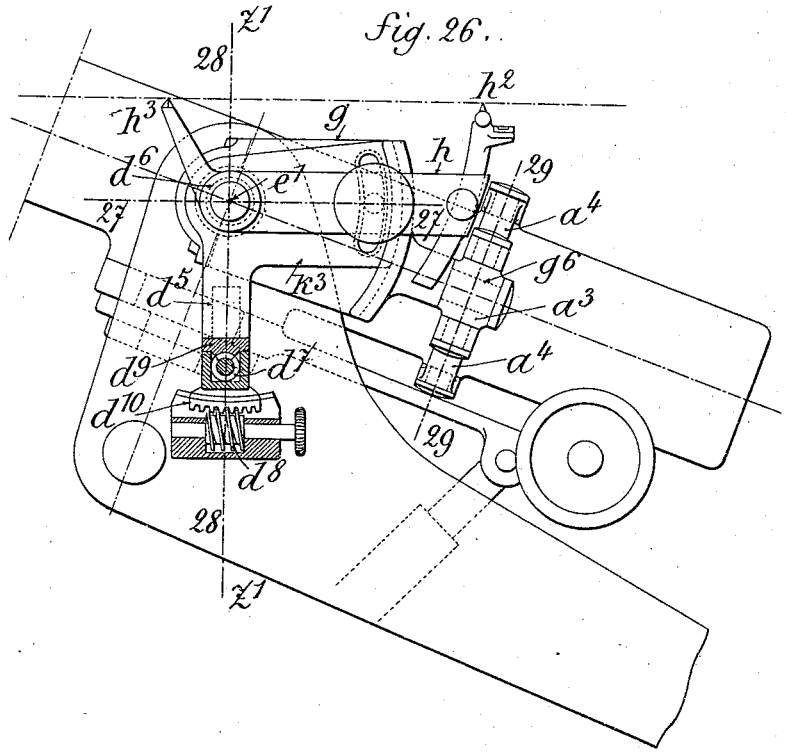
Figure 27:
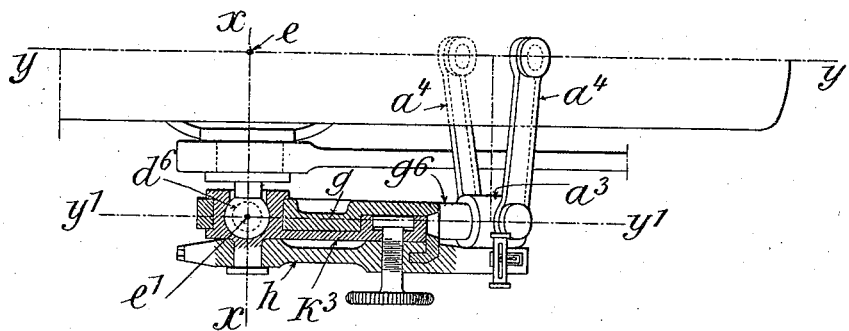
Figure 28:
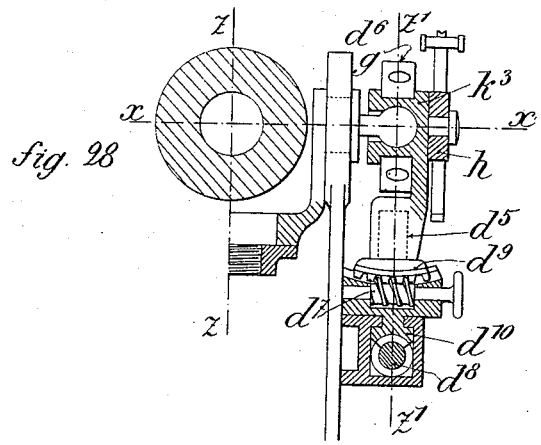
Figure 29:
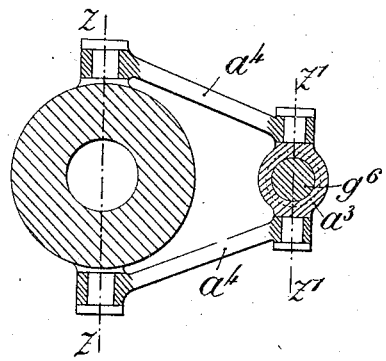
Figure 30:
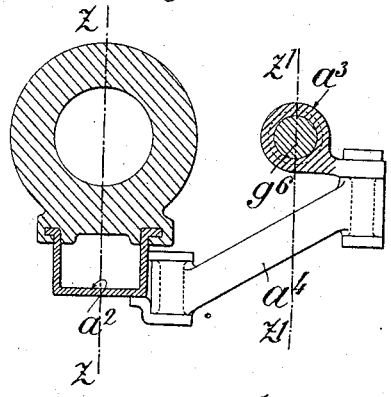
Figure 33:
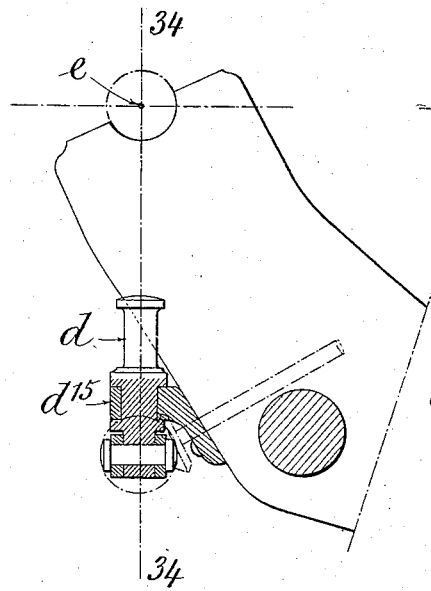
Figure 34:
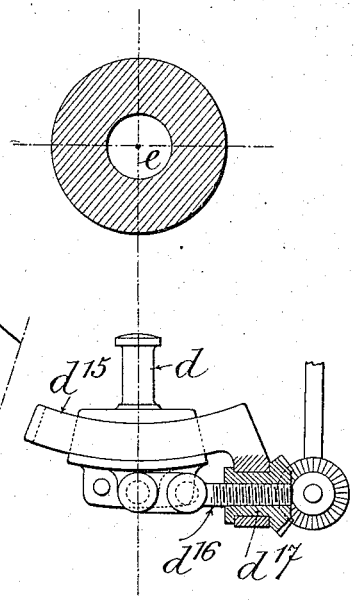

Figures 1 and 2 are diagrammatic views illustrating the relation of the axis of the gun to the line of sight. Fig. 3 is an elevation of a support for the adjusting mechanism, some parts being shown in longitudinal vertical section. Fig. 4 is a section on the line 4 4 of Fig. 3. Fig. 5 is a detail section on the line 5 5 of Fig. 3. Fig. 6 is an elevation of a modified form, partly in section. Fig. 7 is an elevation of another modified form, partly in section. Fig. 8 is a section on the broken line 8 8 of Fig. 7. Fig. 9 is an elevation of a further modified form. Fig. 10 is a plan, partly in section, on the line 10 10 of Fig. 9. Fig. 11 is a side elevation, partly in section, on the line 11 11 of Fig. 9. Fig. 12 is an elevation of a fifth modified form. Fig. 13 is a plan, partly in section, on the line 13 13 of Fig. 12. Fig. 14 is a section on the line 14 14 of Fig. 12. Fig. 15 is a side elevation, partly in section, on the line 15 15 of Fig. 12. Fig. 16 is an elevation of a sixth modified form. Fig. 17 is a side elevation, partly in section, on the line 17 17 of Fig. 16. Fig. 18 is a vertical section of a seventh modified form on the line 18 18 of Fig. 19. Fig. 19 is a front elevation. Fig. 20 is a side elevation, partly in section, on the line 20 20 of Fig. 21. Fig. 21 is a plan, partly in section, on the line 21 21 of Fig. 19. Fig. 22 is an elevation of an eighth modified form. Fig. 23 is a section on the line 23 23 of Fig. 22. Fig. 24 is a plan, partly in section, on the line 24 24 of Fig. 22. Fig. 25 is a side elevation, partly in section, on the line 25 25 of Fig. 22. Fig. 26 is an elevation of a ninth modified form. Fig. 27 is a plan, partly in section, on the line 27 27 of Fig. 26. Figs. 28 and 29 are sections respectively on the lines 28 28 and 29 29 of Fig. 26. Fig. 30 shows a variety of the same modified form. Fig. 31 is an elevation of a tenth modified form of the support for the adjusting mechanism. Fig. 32 is a plan, the gun being removed and a part being in section on the line 32 32 of Fig. 31. Fig. 33 is a vertical section of a pivot-adjusting device. Fig. 34 is a section on the line 34 34 of Fig. 33. Figs. 3 to 11 relate to constructions in which the axis of the gun $a$, that of the pivot $b$, and axis $x$ $x$ of the trunnions $m$ meet at the point $e$.

In the construction shown in Figs. 3, 4, and 5 a vertical guide-pivot $d$ is mounted on the gun-carriage and surrounded by a slide $k$, constituting the directing part. $g$ designates a guide, slidable on the slide $k$ and which turns on the gun by means of an annular part $g'$. The sight-adjusting mechanism $h$ is mounted on the guide $g$ and carries an aiming-glass $h'$, which is thus able to move in a plane parallel to the plane of direction determined by the axis $y$ $y$ of the gun and by the axis $z$ $z$ of the pivot $d$.

In the construction in Fig. 6 the guide $g$ comprises two rings $g'$ $g^2$. The adjusting mechanism is at the aiming-notch and the sight $h^3$. It is not necessary that the said sight shall be a special ring. It can quite as well be carried by the ring $g'$.

The supporting device shown in Figs. 7 and 8 is intended for an adjusting device $h$, having an independent line of aim. The said mechanism is mounted on the slide $g$, in which it is slidable normally concentrically to the plane of direction $z$ $e$ $y$, starting from the point of intersection $e$. The adjusting mechanism $h$ is capable of being, through the medium of the screw $h^4$, coöperatively connected either with the guide $g$ or with the arm $k'$, slidable in the guide $g$, while being prevented from participating in the pointings as to height by a horizontal attachment-stud $k^2$ on the directing part $k$. As in the previous case, the glass $h'$ may be replaced by an aiming-notch and a sight. In the following constructions (shown in Figs. 9 to 25) the vertical pivot used in the former case is replaced by a cylinder-segment $d'$, forming a slideway and fixed on the gun-carriage. The guide $g$, with the ring $g'$, slides when the gun is being pointed as to height in a directing part $k$ concentrically to the line perpendicular to the plane of direction $z\ e\ y$, starting from the point of intersection $e$. The said directing part $k$ does not participate in the movements of the gun as to height. In pointing in direction the ring $g'$ carries forward the directing part $k$, which slides on the segment $d'$ concentrically to the vertical axis $z\ z$, passing through the intersection $e$. The directing part $k$, which carries the adjusting mechanism $h$, only moves, therefore, in a horizontal direction and remains stationary with respect to the vertical plane passing through the axis of the gun—that is, to the plane of direction $z\ e\ y$.

In the construction shown in Figs. 9, 10, and 11 the adjusting mechanism is arranged with a glass which, by means of a spiral screw $h^5$, moves in the main aiming-plane parallelly to the plane of direction $z\ e\ y$ in the arc of a circle.

In the construction shown in Figs. 12, 13, 14, and 15 the adjusting mechanism is represented as having an aiming-notch $h^2$ and a sight $h^3$, carried by an arm $h^6$, which swings in the main plane of aim parallel to the plane of direction $z\ e\ y$. The swinging axis of the arm $h^6$ lies in the line perpendicular to the plane of direction $z\ e\ y$, starting from the point of intersection $e$.

In the construction shown in Figs. 16 and 17 the adjusting mechanism is represented as having an aiming-notch and a sight. The line of aim oscillates parallelly to the plane of direction in an arc which is concentric to the sight $h^3$. An arm $h^6$ is attached to the guide $g$ and is mounted on a pivot $h^7$, fixed to the directing part and of which the axis in the line perpendicular to the plane of direction $z\ e\ y$ passes through the point of intersection $e$.

The construction shown in Figs. 18, 19, 20, and 21 applies to a recoiling gun. The adjusting mechanism $h$ has an independent line of aim, and its support is so fitted as to correct not only the digressions of direction arising from the inclination of the plane of symmetry A with respect to the gun-carriage, but also the digressions arising from the inclination of the plane A—that is, from the inclination of the axle or trunnions. The directing part $k$ is mounted on the segment $d'$. The guide $g$ slides in an arc $a'$ concentric to the gun. The said slideway $a'$ is integral or coöperates with the non-recoiling part $a^2$ of the gun-brake or slideways. The guide $g$ carries an intermediate arm $g^2$ and a spindle $g^3$, which is perpendicular to the plane of direction and loosely mounted on the directing part $k$. A segment $g^4$ is pivoted to a stud $g^5$ perpendicular to the spindle $g^3$ and parallel to axis $y\ y$ of the gun. It participates in all the movements of the ring $g'$. A segment $k^4$, which constitutes an auxiliary directing part, is mounted concentrically to the segment $g^4$. A slideway $k^5$, integral or coöperating with the directing part $k$ and in which is engaged a pivot $d^2$, integral or coöperating with the segment $k^4$, prevents the said segment $k^4$ from participating in the pointing movements as to height. The adjusting mechanism $h$, held between the segments $g^4$ and $k^4$, carries a screw having a hand-wheel $h^4$, which allows of its being made to coöperate with either one of the said segments. When it coöperates with the segment $g^4$, it participates in the pointing movements as to height—for instance, when it is required to put the line of aim on the butt. When it coöperates with the segment $k^4$, it remains stationary while any firing angle is being given to the gun. The plane of the slideway $k^5$ is vertical when the gun-carriage is so placed on the ground that its plane of symmetry A shall be horizontal on the ground. The axis of the guide-pivot $d^2$ may then be held vertical, whatever the inclination of the axle or trunnions may be, by means of a screw $d^3$. The main plane in which moves the line of aim is determined by the vertical axis of the pivot $d^2$ and the axis $y\ y$ of the gun. It is therefore a vertical plane which is constantly parallel to the axis of the gun. When the plane of the slideway $k^5$ is not vertical, the correction is only approximative.

The construction shown in Figs. 22 to 25 relates to the case in which the axis of the trunnions $m$ is placed in any way on the gun-carriage and in which the gun recoils. An auxiliary spindle or stud $m'$ is used, and of which the axis $x'\ x'$ is parallel to the axis $x\ x$ of the trunnions $m$, and passes for all pointings of the gun through the intersection $e^2$ of the axis of the bore and of the axis of the pivot $b$. A guide $g$ is slidable in ar arc $a'$ concentric to the gun and fixed to the non-recoiling part, (brake or slideways.) The directing part $k$ is mounted on the segment $d'$ and connected with the guide $g$, as in several of the aforesaid constructions. The segment $d'$ is mounted on auxiliary spindle or stud $m'$, carried by a lever $m^2$ integral or coöperating with the trunnions $m$. The segment $d'$ is traversed by a vertical slideway $d^4$, on which it slides vertically when the gun is being pointed in height. The said slideway $d^4$ slides horizontally on the gun-carriage, so that the segment $d$ moves, in remaining always horizontal while following the auxiliary spindle or stud $m'$ parallel to the trunnions $m$. In this way the directing part $k$ remains invariable with respect to the plane of direction $y\,e\,z$, since it moves horizontally on the segment $d'$ concentrically to the vertical axis $z\,z$, passing through the movable point of intersection $e^2$, and it is connected, on the other hand, with the guide $g$ by a slideway concentric to the line perpendicular to the plane of direction, starting from the point of intersection $e^2$. The adjusting mechanism $h$ is represented by a glass mounted on the slide $g$. We may also adapt an adjusting mechanism of the ordinary type having an aiming-notch and a sight. The adjusting mechanism may also be arranged on the directing part $k$, as in the construction shown in Figs. 3, 10, and 11. Lastly, we may on the guide $g$, an adjusting mechanism having an independent line of aim, as in the construction shown in Figs. 18, 19, 20, and 21.

In all the aforesaid forms in which the invention may be carried out the axis $z\,z$ of the plane of direction (axis of the pivot $d$ or of the segment $d'$) would meet the axis $y\,y$ of the gun.

In the following constructions shown in Figs. 26 to 32 the plane of direction is determined by any vertical line and a line parallel to the axis $y\,y$ of the gun. The constructions are very analogous to the previous ones; but their guide $g$ instead of turning around the axis of the gun turns around an axis $y'\,y'$ parallel to the gun, and this directing part $k$ instead of sliding on a segment $d'$ the vertical axis $z\,z$ of which passes through the intersection $e$ swings in the present case during the pointing-in direction around a vertical pivot $d^5$, of which the vertical axis $z'\,z'$ determines, together with the axis $y'\,y'$, the plane of direction. The guide $g$ instead of turning around the gun is in the present case mounted, by means of a trunnion $g^6$, (see Figs. 26 to 29,) in a socket $a^3$, which is connected to the gun $a$ by links $a^4$, which cause the same to follow the movements of the gun in height and in direction. The length of the said links is equal to the distance between the axes $z\,z$ and $z'\,z'$, and the position of the trunnion $g^6$ is such that the gun, the links, and the guide $g$ form a jointed parallelogram and maintain the parallelism of the axes $y\,y$ and $y'\,y'$.

The construction shown in Figs. 26 to 29 relates to the case in which the axis of the gun, that of the pivot $b$, and that of the trunnions $m$ concur or meet. The arm $h$, carrying the adjusting mechanism, and the guide $g$ are guided not only by a pivot $d^5$, but also by a ball-and-socket joint $d^6$, the center of which lies in the axis $x\,x$ of the trunnions. The adjusting mechanism $h$ has an independent line of aim, having an aiming-notch $h^2$ and a sight $h^3$.

In the construction shown in Fig. 30, applicable to a recoiling-gun, a socket $a^3$ is held by a single link $a^4$, attached to the non-recoiling part $a^2$, (brake or slideways.)

The construction shown in Figs. 31 and 32 relates to the case in which the axis of the trunnions $m$ no longer passes through the intersection $e$ of the axis of the bore and of the axis of the pivot $b$ and in which the gun recoils, a ball-and-socket joint being then placed on the axis $x\,x$ of the trunnions $m$, so that its distance from the axis of the pivot $b$ always remains the same. The adjusting mechanism $h$ has an independent line of aim, together with a glass, and may be made to coöperate, by means of a screw $h^4$, either with the directing part $k$ or with a segment $g^7$, with which the guide $g$ is provided, the said mechanism having an aiming-notch and sight or other equivalent parts. The link $a^4$ connects the socket $a^3$ with the non-recoiling part (brake or slideways) by studs which are parallel to the pivot $b$ and which keep the plane of the guide $g$ parallel to the axis $y\,y$ of the gun.

When the gun-carriage is placed on inclined ground, the pointing of the gun as to height around the inclined trunnions gives rise to digressions in direction of the same nature as those arising from the inclination of the pivot carrying the gun, although of different importance. The said digressions may be nullified either by a correction of the adjusting mechanism, the plane of aim of which is brought into the vertical position after each modification of the pointing of the gun, or by a single correction the effect of which is to render really vertical the guiding-axis of the plane of direction. In the latter case the plane of direction remains vertical whether the gun is pointed as to height or to direction, and the correction has no longer to be modified unless the gun moves during the firing. The main plane of aim being parallel to the plane of direction on account of the construction, it lies vertical for that reason without requiring any correcting device of its own other than that relating to deviations, which is not taken into account here. The correction of the vertical axis of the plane of direction has the advantage of allowing the supporting device for the adjusting mechanism to correct in an absolutely automatic manner all the digressions of direction for all the operations consisting in pointing the gun, whether the said digressions arise from the inclination of the pivot carrying the gun or from the inclination of the ground. The correction of the plane of aim may be obtained by the construction shown in Figs. 16 and 17 and 22 to 25. The correction of the vertical axis of the plane of direction may be obtained by means of the construction hereinbefore described with reference to Figs. 18 to 21. The pivot $d^2$, mounted on the segment $k^4$, and the directing part $k$ carry nuts $k^6$ and $k^7$, traversed by a screw $d^3$, which allows the axis of the pivot $d^2$ being brought back to the vertical position when the axle of axis of the trunnions is inclined on account of the unlevel ground. In the construction shown in Figs. 26 to 28 two worms $d^7$ and $d^8$ control two arcs $d^9$ and $d^{10}$, the movement of which in two orthogonal directions allows of the axis of the guide-pivot being brought back to the vertical position. In the construction shown in Figs. 31 and 32 the same result is obtained by means of two spiral wheels $d^{11}$ and $d^{12}$, meshing with the teeth arranged for that purpose on the arcs $d^{13}$ and $d^{14}$, concentric with respect to the point $e'$. Practically one may be content with the correction made in the direction of the inclination of the axle, as in the construction shown in Figs. 18 to 21, and neglect the inclination of the axis of the guide-pivot $d^2$ in a plane perpendicular to the axle, which simplifies the correcting device.

Figs. 33 and 34 show a device for making up for the inclination of the axle, which may be used in the constructions shown in Figs. 3, 4, 5, 6, 7, and 8. The guide-pivot $d$ instead of being completely fixed is guided in a fixed slideway $d^{15}$ in a plane perpendicular to the symmetry of the gun-carriage, the said slideway being curved concentrically to the point of intersection $e$. By means of a screw $d^{16}$, of a nut $d^{17}$, and of a suitable gearing the position of the pivot $d$ may be made to vary in such a manner as to render its axis vertical when the axle is inclined.

To sum up, in the various modified forms hereinbefore described the arrangement for carrying and controlling the adjusting mechanism always comprises a directing part $k$, movable with respect to the gun-carriage around an axis perpendicular to the plane of direction and with respect to the gun around the axis of the latter or around an axis parallel to the bore. The axis of rotation of the directing part and the axis of rotation of the guide concur or meet and determine the plane of direction.

The sight-adjusting mechanism is mounted either on the directing part or on the guide and moves in principle parallelly to the plane of direction. In order that the plane of direction shall be vertical, the axis of rotation of the directing part (whether the pivot $d$ or $d^2$ or the segment $d'$) must be adjustable with respect to the gun-carriage in such a manner as to be able to render the same vertical should the ground be inclined. The main plane of aim moves coöperatively with the plane of direction. It may be always fixed with respect to the latter or it may be connected to it in an adjustable manner, which allows of making either partially or wholly up for the inclination of the plane of direction, according to the state of the ground. In the latter case the adjusting mechanism may be provided with an auxiliary axis of rotation, $d^2$ (see Figs. 18 to 21,) which may be brought into a vertical plane parallel to the gun-carriage. The main plane of aim is then no longer absolutely parallel to the plane of direction hereinbefore designated by $z\,e\,y$, but is parallel to an auxiliary plane of direction passing through the said auxiliary axis $d^2$, which may be rendered vertical, and through an axis $g^5$ parallel to the gun.

I claim—

1. A supporting device for the aiming apparatus of a gun mounted on a gun-carrier, comprising a directing-piece, means for guiding the said piece around a vertical axis dependent on the gun-carriage, a guide-piece connected with the directing-piece, means to guide the said guide-piece both around an axis having constantly the same direction as the longitudinal axis of the gun and around an axis perpendicular to the vertical axis, and a support for the aiming apparatus connected with the said guide-piece in an adjustable manner.

2. A supporting device for the aiming apparatus of a gun mounted on a gun-carrier, comprising a directing-piece having a curved slideway means to guide the said piece around a vertical axis dependent on the gun-carriage, a guide-piece a ring on the said guide-piece to surround the gun, a curved slideway in the said guide-piece engaging the slideway of the directing-piece, and a support for the aiming apparatus connected with the said guide-piece in an adjustable manner.

3. A supporting device for the aiming apparatus of a gun mounted on a gun-carrier, comprising a vertical pivot fixed to the gun-carriage, a directing-piece on the said pivot, a guide-piece, a slideway in the said guide-piece and engaging the said directing-piece, a ring on the said guide-piece to surround the gun, and a support for the aiming apparatus connected with the said guide-piece in an adjustable manner.

4. A supporting device for the aiming apparatus of a gun mounted on a gun-carrier comprising a directing-piece, means to guide the said piece around a vertical axis dependent on the gun-carriage, a guide-piece a ring adapted to surround loosely the gun, means to fix the guide-piece to the said ring in an adjustable manner, means to guide the said guide-piece on the directing-piece around an axis perpendicular to both the said vertical axis and the axis of the ring, a support for the aiming apparatus and means to fix the said support to the guide-piece or to its ring in an adjustable manner.

5. A supporting device for the aiming apparatus of a gun mounted on a gun-carrier, comprising a directing-piece, means to guide the said piece around a vertical axis dependent on the gun-carriage, a guide-piece connected with the directing-piece, means to guide the said guide-piece both around the axis of the gun and around an axis perpendicular to the axis of the pivot and to the axis of the gun, a support for the aiming apparatus mounted on the last-named pivot, and means to adjust the verticality or verticalness of the said support.

6. A supporting device for the aiming apparatus of a gun mounted on a gun-carrier comprising a pivot, means to fix the said pivot to the gun-carriage and to adjust the verticality or verticalness of the same, a directing-piece on the said pivot, a guide-piece connected with the directing-piece, means to guide the said guide-piece both around an axis parallel to the longitudinal axis of the gun and around an axis perpendicular to the axis of the pivot and to the axis of the gun, and a support for the aiming apparatus connected with the guide-piece.

In testimony that I claim the foregoing as my invention I have signed my name in presence of two subscribing witnesses.

ERNST TERNSTRÖM.

Witnesses:
H. SAVAGE,
SAMUEL SIEGEL.